(12) United States Patent
Canari et al.

(10) Patent No.: US 8,524,180 B2
(45) Date of Patent: Sep. 3, 2013

(54) PROCESS FOR MINIMISING THE EMISSION OF PARTICULAR MATTER FROM MARINE DIESEL ENGINES

(75) Inventors: Riki Canari, Mobile Post Judean Hills (IL); Aharon Eyal, Jerusalem (IL); Nils Christian Hoy-Petersen, Haslum (NO); Matitiahu Fichman, Haifa (IL); Carl Christian Hauge, Ulset (NO); Carmi Raz, Gizo (IL)

(73) Assignees: Vortex Ecological Technologies Ltd., Haifa (IL); Clue AS, Oslo (NO); Clean Marine AS, Nyborg (NO)

( * ) Notice: Subject to any disclaimer, the term of this patent is extended or adjusted under 35 U.S.C. 154(b) by 0 days.

(21) Appl. No.: 13/123,187

(22) PCT Filed: Oct. 1, 2009

(86) PCT No.: PCT/IL2009/000951
§ 371 (c)(1),
(2), (4) Date: Dec. 9, 2011

(87) PCT Pub. No.: WO2010/041243
PCT Pub. Date: Apr. 15, 2010

(65) Prior Publication Data
US 2012/0107202 A1      May 3, 2012

(30) Foreign Application Priority Data
Oct. 7, 2008   (IL) .......................................... 194614

(51) Int. Cl.
*B01D 53/92* (2006.01)
*B01D 47/06* (2006.01)
*B01D 47/00* (2006.01)
*B01D 45/12* (2006.01)

(52) U.S. Cl.
USPC .................. 423/212; 423/213.2; 423/243.01; 95/92; 95/204; 95/216; 95/219; 95/220

(58) Field of Classification Search
USPC ..................... 423/212, 213.2, 243.01; 95/92, 95/204, 216, 219, 220
See application file for complete search history.

(56) References Cited

U.S. PATENT DOCUMENTS

| | | | | |
|---|---|---|---|---|
| 1,785,453 A * | 12/1930 | Morse et al. | ..................... | 95/220 |
| 2,271,642 A * | 2/1942 | Holzwarth | ..................... | 95/219 |
| 4,921,886 A * | 5/1990 | Ewan et al. | ..................... | 423/235 |
| 2005/0109209 A1 * | 5/2005 | Lee | ..................... | 95/149 |

FOREIGN PATENT DOCUMENTS

| | | |
|---|---|---|
| WO | WO 99/56854 A1 * | 11/1999 |
| WO | WO 2008/035326 A1 * | 3/2008 |
| GB | 2 332 631 A * | 6/1999 |
| JP | 2005-083349 A * | 3/2005 |

* cited by examiner

*Primary Examiner* — Timothy Vanoy
(74) *Attorney, Agent, or Firm* — Kilpatrick Townsend & Stockton LLP.

(57) ABSTRACT

The invention provides a process for minimizing the emission of particulate matter and precursors thereof from a flue gas stream of an engine comprising particulate matter and precursors thereof and at least one gaseous component. The process includes the steps of obtaining a flue gas stream of an engine comprising particulate matter and precursors thereof; increasing the moisture content of the stream by contacting it with a first aqueous medium in an amount and at a temperature at which at least 50% of the water content of the first aqueous medium is evaporated; whereby a moisture laden gas stream, optionally containing suspension droplets, is formed; cooling the moisture laden gas stream whereby suspension droplets are formed; and applying a centrifugal force to the moisture laden gas stream and to the suspension droplets to effect the swirling thereof, whereby a treated gaseous stream and an aqueous stream are formed.

22 Claims, 6 Drawing Sheets

Figure 4

Table 1

| Test | Exp. no | Engine Load % | Fuel % S | Conditions | PM Trapping % | SO2 Trapping % |
|---|---|---|---|---|---|---|
| 1 | 331 | 10 | 2.1 | St 0, W inj 0, W 1,5 , Vent 21 L/min, GR | 53.4 | |
| 2 | 332 | 25 | 2.1 | St 300 W Inj 60 W 2,0 Vent 21, GR | 41.4 | |
| 3 | 323 | 50 | 2.1 | St 0, W Inj 80 W 1,5 Vent 21, GR | 67 | 85.5 |
| 4 | 325 | 50 | 2.1 | St 0, W Inj 80 W 1,5 Vent 0, GR | 73 | 84.0 |
| 5 | 324 | 50 | 2.1 | St 0, W Inj 80 W 1,5 Vent 21, GR | 73.5 | 85.2 |
| 6 | 326 | 50 | 2.1 | St 300 W Inj 0 W 1,5 Vent 21,GR | 77 | 85.4 |
| 7 | 327 | 50 | 2.1 | St 600 W Inj 0 W 1,5 Vent 21,GR | 49 | 85.3 |
| 8 | 328 | 50 | 2.1 | St 300 W Inj 60 W 2,0 Vent 21,GR | 59 | |
| 9 | 321 | 50 | 0.5 | St 0, W Inj 80 W 1,5 Vent 21,GR | 68.0 | 86.0 |
| 10 | 310 | 50 | 0.5 | St 0, W Inj 0 W 2,0 Vent 82 ,GR | 56.0 | 88.0 |
| 11 | 311 | 50 | 0.5 | St 0, W Inj 0 W 2,0 Vent 55 ,GR | 58.0 | 85.0 |
| 12 | 314 | 50 | 0.5 | St 0, W Inj 0 W 2,0 Vent 27, GR | 59.0 | 90.0 |
| 13 | 315 | 50 | 0.5 | St 0, W Inj 80 W 2,0 Vent 55, GR | 65.0 | 90.0 |
| 14 | 313 | 50 | 0.5 | St 0, W Inj 0, W 0, Vent 41,5, GR | 61.0 | 74.0 |
| 15 | 316 | 50 | 0.5 | St 0, W Inj 80 W 2,0 Vent 55, no GR | 63.0 | 73.0 |
| 16 | 312 | 50 | 0.5 | St 0, W Inj 0, W 0, Vent 41,5 no GR | 47.0 | 61.0 |
| 17 | 330 | 75 | 2.1 | St 300 W Inj 80 W 2,0 Vent 21, GR | 62.1 | |
| 18 | 319 | 75 | 0.5 | St 0 W Inj 105 W 1,5 Vent 21, GR | 86.0 | 92.0 |
| 19 | 329 | 100 | 2.1 | St 300 W Inj 85 W 2,0 Vent 21, GR | 57.3 | |
| 20 | 317 | 100 | 0.5 | St 0 W Inj 105 W 1,5 Vent 21, GR | 84.0 | 90.0 |
| 21 | 322 | 50 | 6 ppm | St 0 W Inj 80 W 1,5 Vent 21, GR | 94.0 | 100 |
| 22 | 400* | 50 | 2.1 | St 0, W Inj 80 W 1,5 Vent 0, GR | 21 | 50.0 |
| 23 | 410* | 50 | 2.1 | St 0, W Inj 80 W 1,5 Vent 21 GR | 25 | 57 |
| 24 | 420* | 50 | 2.1 | St 300 W Inj 0 W 1,5 Vent 21, GR | 27 | 62 |

\* = AVC without swirling means of a cylindrical ring with vanes
St= steam injection in L/h at a pressure of about 10psi.
W inj= water injection before AVC in L/h
W = water injection into AVC per gas flow L/Nm3
Vent= injection of water into AVC by using venturi nozzles L/min
GR= gas recycling

PROCESS FOR MINIMISING THE EMISSION OF PARTICULAR MATTER FROM MARINE DIESEL ENGINES

The present invention relates to a process for minimizing the emission of particulate matter and precursors thereof (PM) from a flue gas stream of an engine.

Recently, much environmental attention worldwide has been given to the influence of particles in the atmosphere on human health. This has led to proposed new strict standards on particle emission.

Ships are fast becoming the largest source of air pollution in the EU. Unless more action is taken, by 2020, they will probably emit more gas and particle pollution than all land sources combined.

As a result the International Maritime Organization (IMO) has increased its demands on reduction of Sulfur Oxides (SOx) and Particulate Matters (PM) emission as can be learned from MEPC57-Regulation 14—*Sulfur Oxides (SOx) and Particulate Matters (PM)* [sulfur content in fuel dramatically affects the PM properties and content] which provides as follows:

1) The sulfur content of any fuel oil used on board ships (globally) shall not exceed the following concentrations:
   a) 4.5% prior January 2012
   b) 3.5% on and after 1 Jan. 2012; and
   c) 0.5% on and after 1 Jan. 2020
2) While ships are in ECAs (Emission Control Areas—Baltic and North Sea), the sulfur content in the fuel oil shall not exceed the following limitations:
   a) 1.5% prior 1 Mar. 2010
   b) 1.0% on and after 1 Mar. 2010; and
   c) 0.1% on and after 1 Jan. 2015

The EU legislation allows using technologies that abate the sulfur and PM content in the emitted gas as an alternative to using low-sulfur fuels. Thus, the technology should assure reductions in PM that are at least equal to, or better, than those achieved by lowering the sulfur content in bunker fuel.

Wet Scrubbers are widely used in flue gas desulfurization (FGD) and PM trapping. However, in addition to the required trapping-efficiency, there are many parameters that are factors in choosing the Scrubbers and the operation-conditions. For example equipment size is particularly critical on board of ships where the available space is limited. Another parameter is the pressure-drop range at which the scrubber works efficiently, for example, in cases of using Venturi Scrubbers very efficient removal may be achieved; however, pressure drops which are too high are needed (which may cause back pressure to the engine). The present invention uses an Advanced Vortex Cyclone (AVC) in which the pressure drops are in the range of only 80-250 mm $H_2O$ whereas in Venturi Scrubbers it is in the range of 600-1600 mm $H_2O$.

Another important parameter is careful temperature control in the scrubber that can be achieved by good contact between the droplets and the gaseous phase and by the ability to control the droplets size in the scrubber. (The range for temperature lowering of emitted gas stream resulting from a contact with an aqueous media in the AVC can be in the range of 100-410° C.). The most important mechanism for controlling the exhaust temperature is heating the aqueous droplets introduced into the scrubber and not by evaporation of water molecules. The characteristic time, $\tau$, of the droplets heating is:

$$\tau = \frac{\rho_w D}{6h} \cdot C$$

In which
$\rho = 10^3$ kg/m$^3$ is the density of water
D—droplet diameter
h—convective heat transfer coefficient
C—heat capacity rate.

The main difference between the scrubber used in the present invention and a standard tower spray scrubber (TSS) is the size of the droplets. The droplets in an AVC can be controlled to be 10 times smaller than in a TSS, thus, the heat flux can be 10 times higher and the temperature reduction can be more intensive if needed.

This rough estimate is valuable when there is no relative flow between droplet and gas. In real conditions the relative flow in an AVC is higher than in a TSS and the difference in characteristic time may be even higher.

Some of the prior art describes the use of steam injection (at a very high pressure of about 160 psi) and water injection into the gas pipeline before it enters the scrubber in order to increase PM trapping (e.g. U.S. Pat. No. 3,852,409)

However, the tests in U.S. Pat. No. 3,852,409 were conducted with open hearth exhaust gases. Thus, the range of the smallest particles population in these gases is of about 0.5 microns and the nature of the PM is heavy metal particles. Hence, in the case of diesel engine emission, especially for the system described in the present application, the mean particle diameter is very small, about 20-80 nm, with a very heterogeneous nature of the PM species. In addition, there are several PM absorption mechanisms that are taking place simultaneously, therefore optimal conditions are very difficult to be found and to be achieved.

D. B. Kittelson in his several publications (e.g. Engine and Nanoparticles: A Review" J. Aerosol Sci. Vol. 29, No. 5/6, pp. 575-588, 1998) dealing with particulate matter (PM) species of diesel engine emission, PM formation and their growth. Kittelson claims that nearly all of the particulate matter found in the tailpipe before dilution is present as solid hydrophobic carbonaceous agglomerates and a small amount of metallic ash. However there also is present a significant quantity of particle precursors such as volatile organic compounds (VOC) and sulfur compounds in the gas phase at exhaust temperatures, that are transformed to diesel particulate matter by nucleation, adsorption, and condensation as the exhaust dilutes and cools. Part of the mass of volatile material that is transformed into PM during dilution and cooling adsorbs onto the surface of existing carbonaceous agglomerates. However another part may undergo homogeneous nucleation to form new particles in the nanometer diameter range.

There are several mechanisms involved in PM formation and PM absorption following aqueous solution or steam injection into the gas pipeline before the scrubber. One of them is condensation of volatile organic compounds (VOC) on the surface of existing carbonaceous agglomerates. Another mechanism is condensation of the VOC to form homogeneous PM of VOC that are followed by PM trapping in the scrubber. The condensation mechanisms are enhanced by low temperature of the gaseous stream.

Another mechanism is wetting of solid PM (carbonaceous) followed by its adsorption and/or penetration on or into water droplets. This mechanism, in contrast to the first one, is enhanced by high temperature (especially the first stage of wetting the PM). In addition it is enhanced by adding a hydrophobic compound or surfactant to the water droplets.

There are other mechanisms which may take place as a result of steam or aqueous solution injection, for example: coagulation of solid PM to form larger PM, oxidation or hydrogenation of the PM (mainly their surface) and unification of droplets to form enlargement of droplets.

As mentioned above there are several PM species in diesel engine emission. The formation-mechanism of these PMs and trapping-mechanisms are influenced differently by the operation conditions such as gas temperature, gas humidity, added amount of water, nature of aqueous-solution, steam amount, droplets size range, pressure-drop, pH of the aqueous solution etc. Achieving an optimal range of conditions for trapping the overall PM is very difficult.

Currently there is a need for a very efficient Particulate Matters (PM) absorption technology specifically from a flue gas stream of engines, particularly in situations of low pressure drop and excellent temperature control. And for the provision of PM absorption technology requiring only small volumes of aqueous solution, and utilizing smaller-sized equipment. Thus there is a need for PM absorption technology that is characterized by very efficient contact, small equipment size, simplicity and high cost effectiveness as compared to other systems that are presently in use and other suggested technologies.

The main objective of the present invention is to provide a cost effective method for removing particulate matter from a hot gas stream, preferably from an exhaust gas stream.

A further objective is to provide a cost effective method for the absorption of emitted particulate matters from flue gases of engines, such as diesel engines in ships, using very efficient equipment, as compared to the prior art.

Still another object of the present invention is to reduce air pollution which results from particulate matters.

Thus according to the present invention, there is now provided a process for minimizing the emission of particulate matter and precursors thereof from a flue gas stream of an engine comprising particulate matter and precursors thereof and at least one gaseous component, which process comprises the steps of:
  a. obtaining a flue gas stream of an engine comprising particulate matter and precursors thereof;
  b. increasing the moisture content of said stream by contacting the same with a first aqueous medium in an amount and at a temperature at which at least 50% of the water content of the first aqueous medium is evaporated; whereby a moisture laden gas stream, optionally containing suspension droplets, is formed;
  c. cooling said moisture laden gas stream whereby suspension droplets are formed; and
  d. applying a centrifugal force to said moisture laden gas stream and to said suspension droplets to effect the swirling thereof; whereby a treated gaseous stream and an aqueous stream are formed; and
wherein the content of particulate matter in said treated gaseous stream is reduced by at least 50% compared with that in said hot gas stream as measured by cooling to about 50° C. with no further treatment and wherein said centrifugal force in step d is characterized in that the velocity of said moisture laden gas stream is between 20 m/sec and 120 m/sec.

In preferred embodiments of the present invention said velocity of said moisture laden gas stream in step d is between 60-100 m/sec.

Preferably said swirling is conducted in a cyclone unit comprising a housing defined by a cylindrical peripheral wall and provided with at least one inlet opening for receiving fluids thereinto and with at least one swirling means.

In preferred embodiments of the present invention said swirling means comprises a plurality of vanes, said vanes being arranged regularly along a circular path, tangentially with respect thereto and passages are formed by open spaces between adjacent vanes.

In especially preferred embodiments of the present invention said cooling is conducted by steps selected from the group consisting of: contacting with a second aqueous medium; contacting with at least part of said treated gaseous stream of stage (d); contacting with an air source; and combinations thereof.

Preferably the temperature of said moisture laden stream is decreased upon said contact with said second aqueous medium by 100° C. to 410° C.

Preferably said cooling said moisture laden gas stream comprises contacting said moisture laden gas stream with a second aqueous medium.

Preferably said second aqueous medium is selected from the group consisting of aqueous solutions, sea water solution, waste water, alkaline aqueous solutions, NaOH-comprising aqueous solution, bisulfite aqueous solution and basic aqueous solutions.

Preferably the temperatures of said flue gas stream are in a range between 170° C. and 450° C.

In some preferred embodiments of the present invention said first aqueous medium is selected from the group consisting of water, steam, aqueous solutions, sea water, NaOH-comprising aqueous solution, waste water, bisulfite aqueous solution and basic aqueous solutions.

Preferably said amount of said first aqueous medium in step (b) is in a range between 3 and 100 gram per Nm3 of said flue gas stream of step a.

In especially preferred embodiments of the present invention the absolute humidity of the moistened stream is between 50 gr/Nm3 and 200 gr/Nm3.

Preferably the temperature of the moisture laden gas stream is in a range between 60° C. and 290° C.

In some preferred embodiments of the present invention said contacting with said first aqueous medium is conducted by means of injecting said aqueous medium into said flue gas stream by means of at least one nozzle.

Preferably in said embodiments said injection is conducted by using at least three nozzles arranged in a form selected from the group consisting of at least one ring form, at least one coil form, and at least one linear form.

Preferably the ratio between the flow of said second aqueous medium and that of said moisture-laden-gas stream is between 1 Kg per 1 $Nm^3$ and 2.5 Kg per 1 $Nm^3$.

In preferred embodiments of the present invention said centrifugal force is applied by a cyclone unit and the pressure of the gas stream drops in said cyclone unit.

In said preferred embodiments preferably said pressure drop is in the range between 80 $cmH_2O$ and 250 $cmH_2O$.

In preferred embodiments of the present invention said engine is a diesel engine operating on board of a ship.

Preferably the content of particulate matter in said treated gaseous stream is reduced by at least 65% compared with that in said flue gas stream after being cooled to 50° C. with no further treatment.

In some preferred embodiments of the present invention the content of $SO_2$ in said treated gaseous stream is reduced by at least 90% compared with that in said flue gas stream after being cooled to 50° C. with no further treatment.

In preferred embodiments of the present invention said process further comprises a step wherein an NaOH aqueous solution is injected into said treated gaseous stream.

In some preferred embodiments of the present invention said process further comprises the step of adding an activated carbon to at least one of said flue gas stream, said moisture laden gas stream, first aqueous medium and second aqueous medium.

In a preferred embodiment, the volume ratio between the flow of said second aqueous medium and that of said moisture laden gas stream is between 0.3/1 to 6/1 liter/Nm3 and preferably between 1/1 to 2.5/1 liter/Nm$^3$. In an open sea it is preferred injecting into the AVC large amount of said second aqueous medium preferably between 4/1 to 6/1 liter/Nm$^3$ since in this case waste water treatment is less problematic. In this case the preferred aqueous medium is sea water.

The term particulate matter as used herein is intended to denote matter in a state of solid or liquid.

The term precursor of particulate matter as used herein is intended to denote a compound found as such or in a modified from in or on particulate matter in a gas stream after cooling it to about 50° C.

The term suspension droplet as used herein is intended to denote a droplet containing water and at least one particulate matter and precursors thereof, in any combination, including PM adsorbed on the surface of the droplet, PM suspended in the droplet and PM dissolved in the droplet.

The term gaseous component as used herein is intended to denote a compound that is gaseous at a temperature greater than 0° C.

For determining the efficiency yield of particulate-matter removal, the PM was trapped by using a Teflon® filter in two partial dilution tunnels, and for determining the number size distribution of the PM, a Scanning Mobility Particle Sizer (SMPS) spectrometer was used.

While the invention will now be described in connection with certain preferred embodiments in the following examples and with reference to the accompanying figures so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

In the drawings:

FIG. 4 is a graphical presentation of a table setting forth the results of experiments carried out according the examples herein;

Figure 1:
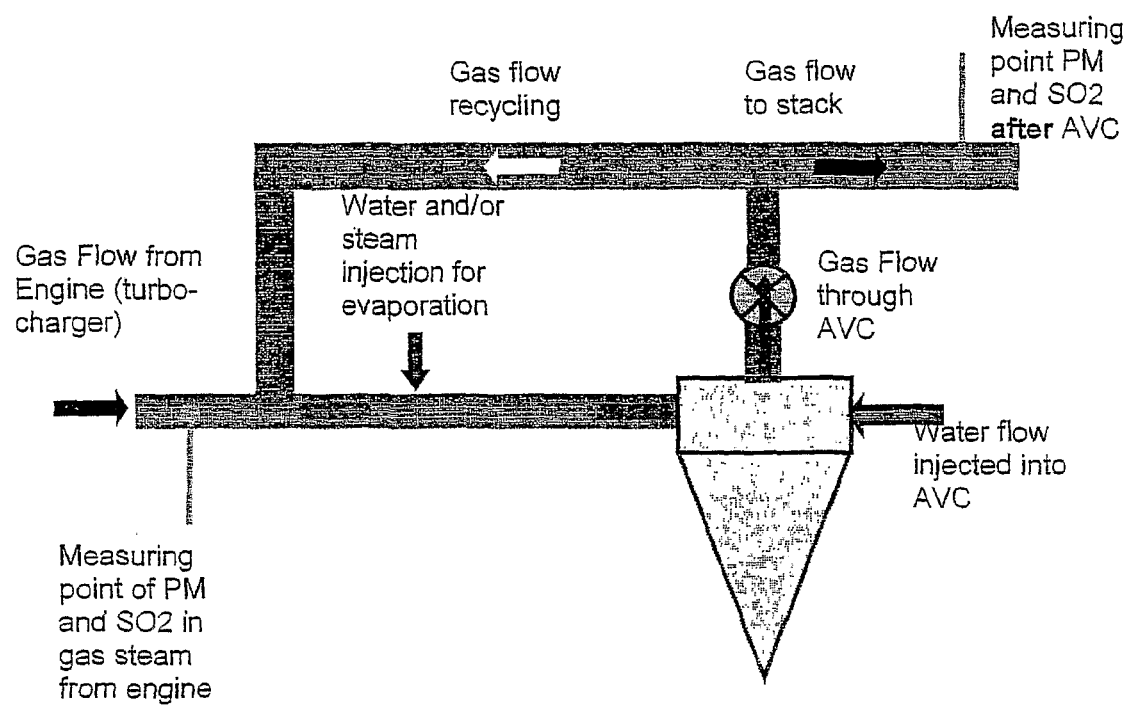
FIG. 1 is a schematic presentation of the process.

Referring to FIG. 1 there is seen a preferred flow sheet for the process in which a hot gas stream comprising particulate-matter and at least one gaseous component is obtained from a diesel engine (preferably after passing in a receiver, turbocharger and/or economizer). Said gas stream is contacted with a treated gaseous stream and thereby the temperature of the gas stream is reduced. A water stream or a steam stream is injected into the gas stream and thereby the moisture content of said gas stream is increased (at least 95% of the water is in vapor form). Then the moisture laden gas stream is introduced into the AVC where it is swirled and contacted with a second aqueous source and a centrifugal force is applied to form suspension droplets. Said suspension droplets, which comprise condensed VOC, $H_2SO_3$ $H_2SO_4$, water and particulate matter are separated efficiently in the AVC from the treated gaseous stream.

Figure 2:
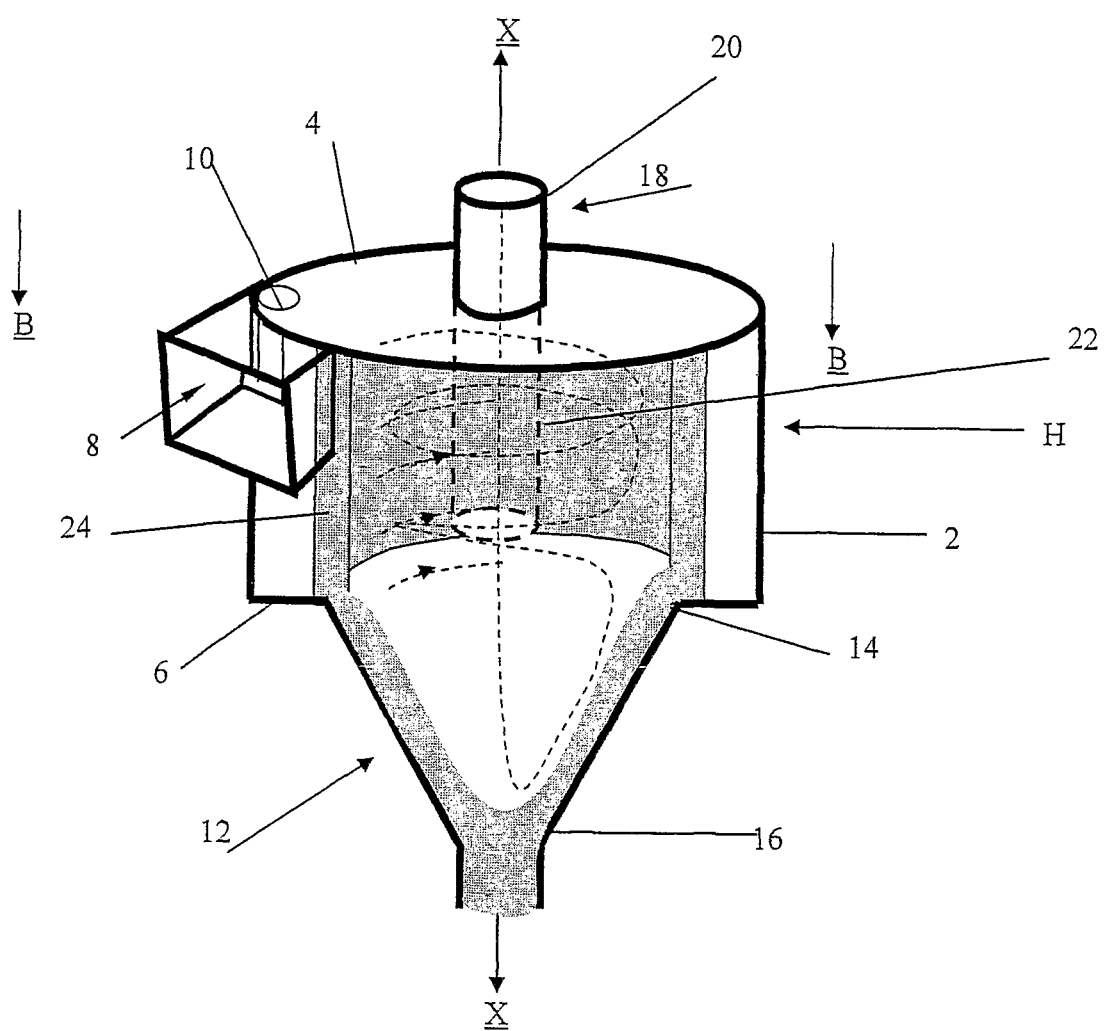
FIG. 2 is a schematic presentation of the cyclone unit according to the present invention.
Figure 3:
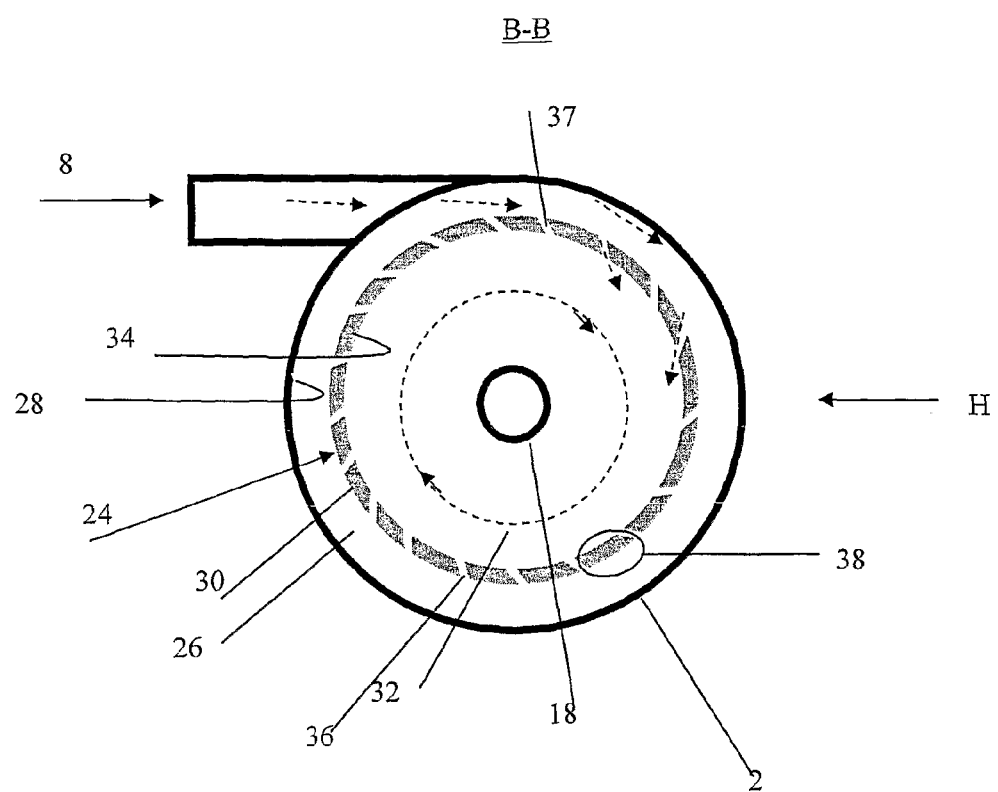
FIG. 3 is a cross-sectional view of a housing taken along B-B.

Referring to FIG. 2-3 there is seen a preferred cyclone unit for use according to the present invention comprising: a housing (H) defined by a cylindrical peripheral wall (2) thereof and by upper (4) and lower (6) extremities, said housing having a longitudinal axis (X-X) and being provided with at least one inlet opening (8) for receiving said gaseous stream and at least one inlet opening (10) for receiving said aqueous stream thereinto. Said cyclone unit further comprises an outlet means from said housing (H) preferably formed as a hollow truncated cone (12), having a large base (14) and a spaced apart small base (16), the large base thereof being in communication with the lower extremity (6) of said housing (H). A pipe means (18) is placed within said housing (H), preferably coaxially with the longitudinal axis (X-X) wherein an uppermost extremity (20) of the pipe means (18) is located outside of the housing, and a lowermost extremity (22) of said pipe means is located within the housing.

Said cyclone unit further comprises at least one swirling means (24) being formed as a cylindrical ring and being mounted within said housing, coaxially with the longitudinal axis (X-X) so as to provide an annular space (26) between the housing central wall (28) and the peripheral wall (30) of said swirling means and to provide an inner annular space (32) between the central wall (34) of the swirling means (24) and the lowermost extremity (22) of said pipe means (18).

Said swirling means (24) are defined by a plurality of openings (36) so as to enable passage from said annular space (26) towards said inner annular space (32). Said swirling means is formed with plurality of vanes (39) said vanes being arranged regularly along a circular path, preferably tangentially with respect thereto and said plurality of openings (36) are formed by open spaces between the adjacent vanes (39).

Using the cyclone unit described above, said gaseous stream enters through at least one of said inlet openings (8) to said annular space (26) and then passes through at least one of said plurality of openings (36) and then at least one passages (37) towards said inner annular space (32), while said aqueous stream enters through at least one of said inlet openings (10) into said housing and is contacted with said gaseous stream. These two mixed streams are then caused to flow through said hollow truncated cone (12) whereas said gaseous product is exiting though said pipe means (18), while said wash solution is collected through said small base (16) of said hollow truncated cone (12) into said appropriate collecting receptacle.

The passage of said gaseous stream through said plurality of openings (36), and then passages (37) results in an unexpectedly high velocity of said gaseous stream, said velocity being between 20 m/sec-120 m/sec, and in preferred embodiments being between 60-70 m/sec. As a result a very efficient contact between said gaseous and aqueous streams is achieved. This is compared to a typical cyclone scrubber that is characterized by the ability to produce a velocity of about 15-50 m/sec.

In especially preferred embodiments of the present invention said cyclone unit is of the type described in EP 0971787B1, comprising a housing (H) defined by cylindrical peripheral wall (2) thereof and by upper (4) and lower (6) extremities, said housing having a longitudinal axis (X-X) and being provided with at least one inlet (8) opening for receiving streams thereinto, said inlet opening being formed within said peripheral wall (2) and being directed preferably tangentially with respect thereto; an outlet means from said housing (H) being formed preferably as a hollow truncated cone (12), having a large base (14) and a spaced apart small base (16), the large base thereof being in communication with the lower extremity of said housing (6) and said small base thereof being in communication with an appropriate collecting receptacle, a pipe means (18) being placed within said housing, preferably coaxially with the longitudinal axis (X-X), an uppermost extremity (20) of the pipe means being located outside of the housing and a lowermost extremity (22) of said pipe means being located within the housing; at least one swirling means (24) for imparting vertical motion to said fluid, said swirling means being formed as a tubular member, defined by a peripheral annular wall (38) with an opposite upper and lower end, said swirling means being mounted within said housing coaxially with the longitudinal axis of said housing so as to provide for an annular space (26) therebetween, said swirling means being provided with a plurality of slit-like elongated openings (36), formed in the peripheral wall (38) thereof so as to enable passage of fluid therethrough, characterized in that said pipe means extends along the swirling means and slit-like openings are arranged regularly on the peripheral wall (38) of the swirling means so as to extend substantially tangentially with respect to the interior thereof, wherein said slit-like openings (36) are defined by a length and width dimension, and wherein the length dimension exceeds the width dimension.

It is important to note that it was not self evident that the cyclone units described in EP 0971787B1 and above for removal of particulate matter from flue gases would be effective for the removal of PM specifically from exhaust gas. In the case of solid particle removal in a cyclone unit the main objective or challenge is to maximize the difference between the motions of the gas and those of the particles inside the cyclone unit and thereby to achieve separation between these two elements.

In contradistinction, in the case of removal of PM from exhaust gas, one should consider that there are in general various PM species: hydrophobic solid carbonaceous agglomerates and a small amount of solid metallic ash, various vaporized volatile organic compounds (VOC) and, vaporized sulfur compounds. ($NO_2$ may also be included in this section since it can be easily form $H_2NO_3$, however, its concentration is only 5-20 ppm comparing to 250-400 ppm $SO_2$ in the case of 1.7% S in fuel). During the way from the engine towards the atmosphere, the vaporized PM may move from the gas phase to the particle phase mainly by the two paths: (1) adsorption on or absorption into existing particles and aqueous droplets or (2) nucleation to form new particles.

From the trapping point of view of the vaporized PM, the first path is favored over the second (formation of new particles), since, in the latter, large amounts of very small PM (even below 10 nm) are formed, which are hardly trapped in any scrubber.

The surface nature of PM from exhaust gas is basically hydrophobic. One of the ways for achieving good contact between the solid PM and the aqueous solution introduced into the AVC is by modifying their surface nature to be more hydrophilic (and by that to get good wetting in the first stage).

The water molecules in said first aqueous source that is introduced into the hot gaseous stream may chemically react with solid PM or volatile PM at this high temperature, for example by oxidation (as in the case of active carbon formation). In addition, liquid water (droplets and/or water layer on particles) provide a medium wherein such chemical reactions are accelerated. Such reactions may change the surface of the particle to a more hydrophilic one.

EXAMPLES 1-24

In 24 separate experiments, flue gas that was produced by using a 1MW MAN diesel engine was contacted with 0.01-0.05% w/w NaOH aqueous solution by using an Advanced Vortex Cyclone (AVC) of a volume of 10000 $m^3$, according to the flow diagram presented in FIG. 1. In some cases before entering into AVC water stream or/and steam stream was injected into the flue gas. Table 1 presents the conditions in each experiment: the engine capacity, the flow of the flue gas, the temperature of the flue-gas stream entering and exiting the cyclone unit, the composition of the aqueous solution, the $SO_2$ concentration in the flue gas stream entering the unit and the Liquid to Gas volume-ratio (L/G ratio).

Figure 5:
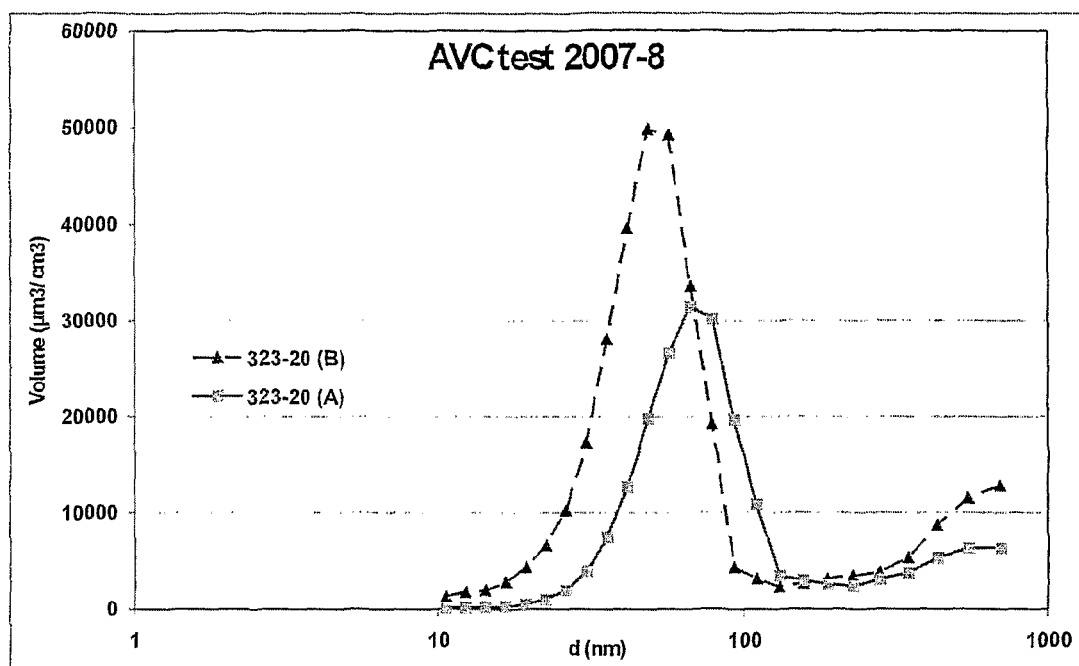
FIG. 5 is a graphical representation presenting the PMs volume per gas volume as a function of the PM diameter.

FIG. 5 is a graphical representation presenting the PMs volume per gas volume as a function of the PM diameter, dV/d logd ($\mu m^3/cm^3$), in the gas stream coming from the engine (B) and after the AVC (A), in experiment #323 in which the content of the S in the fuel was about 6 ppm. The volume was calculated by multiplying the PM numbers per gas volume (as measured by SMPS) in certain diameter by ⅙*d^3*PI (assuming ball shape of the PM)

Figure 6:
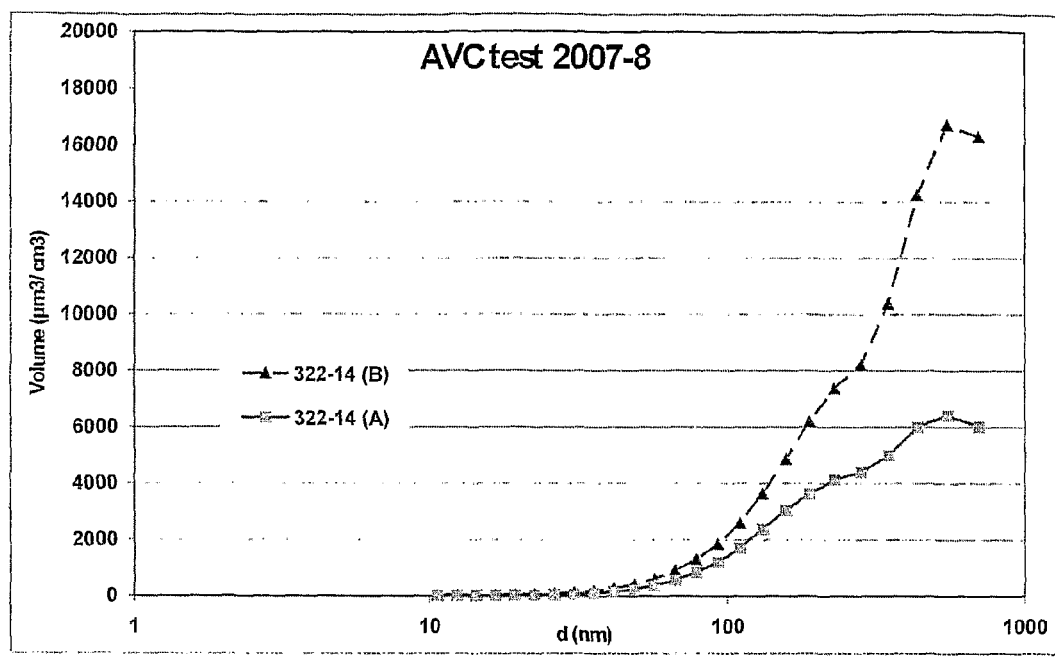
FIG. 6 is a graphical representation showing the total PMs volume per gas volume as a function of the PM diameter.

FIG. 6 is a graphical representation showing the total PMs volume per gas volume as a function of the PM diameter, dV/d logd ($\mu m^3/cm^3$), in the gas steam coming from the engine (B) and after the AVC (A), in experiment #322 in which the content of the S in the fuel was about 6 ppm. The volume was calculated by multiplying the PM numbers per gas volume (as measured by SMPS) in certain diameter by ⅙*d^3*PI (assuming ball shape of the PM).

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A process for minimizing the emission of particulate matter and precursors thereof from a flue gas stream of an engine, the flue gas stream comprising particulate matter and precursors thereof and at least one gaseous component, which process comprises the steps of:
    a. obtaining a flue gas stream of an engine comprising particulate matter and precursors thereof;
    b. increasing the moisture content of said stream by contacting the same with a first aqueous medium in an amount and at a temperature at which at least 50% of the water content of the first aqueous medium is evaporated; whereby a moisture laden gas stream, optionally containing suspension droplets, is formed;
    c. cooling said moisture laden gas stream, said cooling comprising contacting said moisture laden gas stream with a second aqueous medium, whereby suspension droplets are formed; and d. applying a centrifugal force to said moisture laden gas stream and to said suspension droplets to effect the swirling thereof; whereby a treated gaseous stream and an aqueous stream are formed;

wherein the content of particulate matter in said treated gaseous stream is reduced by at least 50% compared with that in said flue gas stream, as measured by cooling to about 50° C. with no further treatment, and wherein said centrifugal force in step d is characterized in that the velocity of said moisture laden gas stream is between 20 m/sec and 120 m/sec.

2. A process according to claim 1 wherein said velocity of said moisture laden gas stream in step d is between 60-100 m/sec.

3. A process according to claim 1 wherein said swirling is conducted in a cyclone unit comprising a housing defined by a cylindrical peripheral wall and provided with at least one inlet opening for receiving fluids thereinto and with at least one swirling means.

4. A process according to claim 3 wherein said swirling means comprises a plurality of vanes, said vanes being arranged regularly along a circular path, tangentially with respect thereto and passages are formed by open spaces between adjacent vanes.

5. A process according to claim 1 wherein said cooling further comprises contacting said moisture laden gas stream with an air source.

6. A process according to claim 5 wherein the temperature of said moisture laden stream is decreased upon said contact with said second aqueous medium by 100° C. to 410° C.

7. A process according to claim 1 wherein the temperatures of said flue gas stream is in a range between 170° C. and 450° C.

8. A process according to claim 1 wherein said first aqueous medium is selected from the group consisting of water, steam, aqueous solutions, sea water, NaOH-comprising aqueous solution, waste water, bisulfate aqueous solution and basic aqueous solutions.

9. A process according to claim 1 wherein said amount of said first aqueous medium in step (b) is in a range between 3 and 100 gram per $Nm^3$ of said flue gas stream of step a.

10. A process according to claim 1 wherein the absolute humidity of the moisture laden gas stream is between 50 $gr/Nm^3$ and 200 $gr/Nm^3$.

11. A process according to claim 1 wherein the temperature of the moisture laden gas stream is in a range between 60° C. and 290° C.

12. A process according to claim 1 wherein said contacting with said first aqueous medium is conducted by means of injecting said aqueous medium into said flue gas stream by means of at least one nozzle.

13. A process according to claim 12 wherein said injection is conducted by using at least three nozzles arranged in a form selected from the group consisting of at least one ring form, at least one coil form, and at least one linear form.

14. A process according to claim 1 wherein said second aqueous medium is selected from the group consisting of aqueous solutions, sea water solution, waste water, alkaline aqueous solutions, NaOH-comprising aqueous solution, bisulfite aqueous solution and basic aqueous solutions.

15. A process according to claim 14 wherein the ratio between the flow of said second aqueous medium and that of said moisture-laden-gas stream is between 1 Kg per 1 $Nm^3$ and 2.5 Kg per 1 $Nm^3$.

16. A process according to claim 1 wherein said centrifugal force is applied by a cyclone unit and the pressure of the gas stream drops in said cyclone unit.

17. A process according to claim 16 wherein the pressure of the gas stream drops by an amount in the range between 80 $cmH_2O$ and 250 $cmH_2O$.

18. A process according to claim 1 wherein said engine is a diesel engine operating on board of a ship.

19. A process according to claim 1 wherein the content of particulate matter in said treated gaseous stream is reduced by at least 65% compared with that in said flue gas stream after being cooled to 50° C. with no further treatment.

20. A process according to claim 1 wherein the content of $SO_2$ in said treated gaseous stream is reduced by at least 90% compared with that in said flue gas stream after being cooled to 50° C. with no further treatment.

21. A process according to claim 1 further comprising a step wherein an NaOH aqueous solution is injected into said treated gaseous stream.

22. A process according to claim 1 further comprising the step of adding activated carbon to at least one of said flue gas stream, said moisture laden gas stream, said first aqueous medium and said second aqueous medium.

* * * * *